United States Patent
Chan et al.

(10) Patent No.: US 7,057,835 B2
(45) Date of Patent: Jun. 6, 2006

(54) DATA TRACK PER INCH OPTIMIZATION THROUGH COMPILATION OF VOLTAGE GAIN AMPLIFIER CONTROL SIGNAL DATA

(75) Inventors: Tom Chan, San Marino, CA (US); Yunxiang Wu, San Jose, CA (US)

(73) Assignee: Samsung Electronics Co., Ltd., Suwon City (KR)

( * ) Notice: Subject to any disclaimer, the term of this patent is extended or adjusted under 35 U.S.C. 154(b) by 0 days.

(21) Appl. No.: 10/873,813

(22) Filed: Jun. 21, 2004

(65) Prior Publication Data

US 2005/0280917 A1    Dec. 22, 2005

(51) Int. Cl.
  *G11B 5/09*    (2006.01)
(52) U.S. Cl. ........................................ 360/46
(58) Field of Classification Search ............. None
  See application file for complete search history.

(56) References Cited

U.S. PATENT DOCUMENTS

| | | | | |
|---|---|---|---|---|
| 5,691,857 | A * | 11/1997 | Fitzpatrick et al. | 360/53 |
| 6,445,525 | B1 * | 9/2002 | Young | 360/51 |
| 6,476,989 | B1 * | 11/2002 | Chainer et al. | 360/31 |
| 6,498,693 | B1 * | 12/2002 | Au et al. | 360/31 |
| 6,587,293 | B1 * | 7/2003 | Ding et al. | 360/51 |
| 6,633,442 | B1 * | 10/2003 | Quak et al. | 360/31 |
| 6,643,084 | B1 * | 11/2003 | Andrew et al. | 360/53 |
| 6,671,790 | B1 * | 12/2003 | Gay Sam et al. | 360/75 |
| 6,751,036 | B1 * | 6/2004 | Quak et al. | 360/48 |
| 6,771,441 | B1 * | 8/2004 | Tang et al. | 360/31 |

* cited by examiner

*Primary Examiner*—David Hudspeth
*Assistant Examiner*—Glenda P. Rodriguez
(74) *Attorney, Agent, or Firm*—Ben J. Yorks; Jeffrey P. Aiello; Irell & Manella LLP

(57) ABSTRACT

A method for providing data to determine an optimal track per inch ("TPI") density for a head of a hard disk drive. The method utilizes a VGA control signal that is used in an automatic gain control loop of the disk drive. First VGA values are stored during a routine where a head reads the disk at different offset positions across an N track. The head is then moved to an offset position of an adjacent track N+1 and then erases at least a portion of the N+1 track. Second VGA values are then stored as the head again reads the N track at different offset positions of the track. This process is repeated for a plurality of different TPI values. The effective head width is determined from the second VGA values are plotted relative to different TPI values. An optimum TPI value can be determined from this plot.

15 Claims, 5 Drawing Sheets

DATA TRACK PER INCH OPTIMIZATION THROUGH COMPILATION OF VOLTAGE GAIN AMPLIFIER CONTROL SIGNAL DATA

BACKGROUND OF THE INVENTION

1. Field of the Invention

The subject matter disclosed generally relates to the field of hard disk drives.

2. Background Information

Hard disk drives contain a plurality of magnetic heads that are coupled to rotating disks. The heads write and read information by magnetizing and sensing the magnetic fields of the disk surfaces. Each head is attached to a flexure beam to create a subassembly commonly referred to as a head gimbal assembly ("HGA"). The HGA's are attached to an actuator arm that has a voice coil coupled to a magnet assembly. The voice coil and magnet assembly create a voice coil motor that can pivot the actuator arm and move the heads across the disks.

Information is typically stored within annular tracks that extend across each surface of a disk. The voice coil motor can move the heads to different track locations to access data stored onto the disk surfaces. Each track is typically divided into a plurality of adjacent sectors. Each sector may have one or more data fields. Each data field has a series of magnetic transitions that are decoded into binary data. The spacing between transitions define the bit density of the disk drive. It is generally desirable to provide a high areal density to increase the overall storage capacity of the drive. The areal density is defined as the product of the tracks per inch ("TPI") and bits per inch ("BPI") density of the disk.

The track density, also referred to as tracks per inch ("TPI") is limited by the width of the heads and the tolerances associated with the head widths. The head width tolerance can be up to 10% of the nominal design track pitch. Some drives create a variable TPI format to compensate for different head widths. Present techniques to determine the optimal TPI per head include a bit error rate technique which is a time consuming method that also requires a read channel optimization process. It would be desirable to determine an optimal TPI per head that does not require as much time as techniques of the prior art.

BRIEF SUMMARY OF THE INVENTION

A method for providing data to determine an optimal track density for a head of a hard disk drive. The method includes offsetting a head of a N+1 track and erasing a portion of the track. The head is then moved to an N track. VGA control signal data is stored for different offset portions of the N track. This procedure is repeated for different track densities. A plurality of effective head widths is then determined and plotted versus different track densities.

DETAILED DESCRIPTION

Disclosed is a method for providing data to determine an optimal track per inch ("TPI") density for a head of a hard disk drive. The method utilizes a VGA control signal that is used in an automatic gain control loop of the disk drive. First VGA values are stored during a routine where a head reads the disk at different offset positions across an N track. The head is then moved to an offset position of an adjacent track N+1 and then erases at least a portion of the N+1 track. Second VGA values are then stored as the head again reads the N track at different offset positions of the track. This process is repeated for a plurality of different TPI values. The effective head width is determined from the second VGA values and plotted relative to different TPI values. An optimum TPI value can be determined from this plot.

Figure 1:
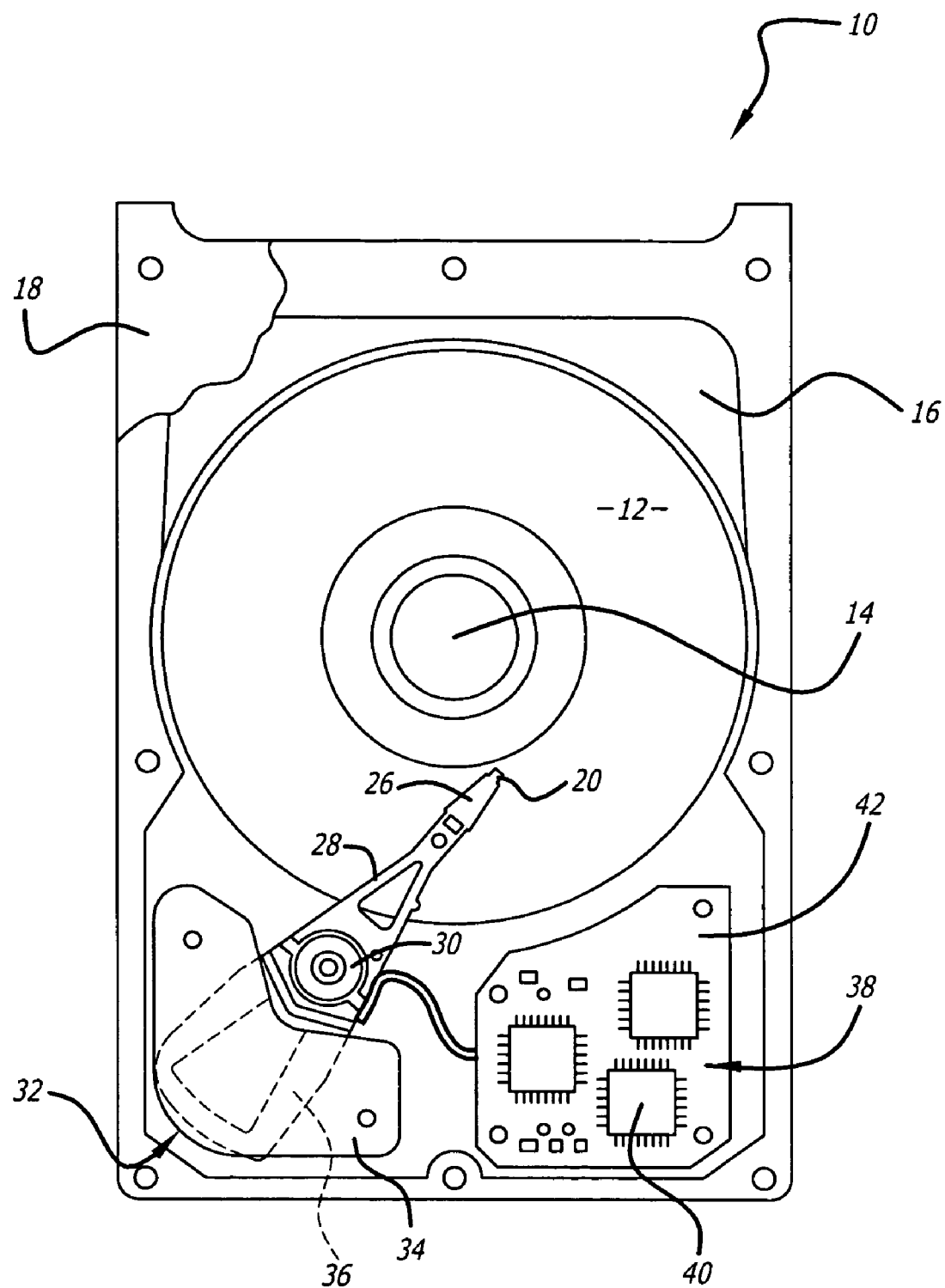
FIGS. 1 is a top view of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown in FIG. 1) that magnetize and sense the magnetic fields of the disks 12, respectively.

Each head 20 may be gimbal mounted to a flexure beam 22 as part of a head gimbal assembly (HGA). The flexure beams 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

Each head 20 has an air bearing surface (not shown) that cooperates with an air flow created by the rotating disks 12 to generate an air bearing. The air bearing separates the head 20 from the disk surface to minimize contact and wear.

The hard disk drive 10 may include a printed circuit board assembly 34 that includes a plurality of integrated circuits 36 and 38 coupled to a printed circuit board 40. The printed circuit board 40 is coupled to the voice coil 28, heads 20 and spindle motor 14 by wires (not shown).

Figure 2:
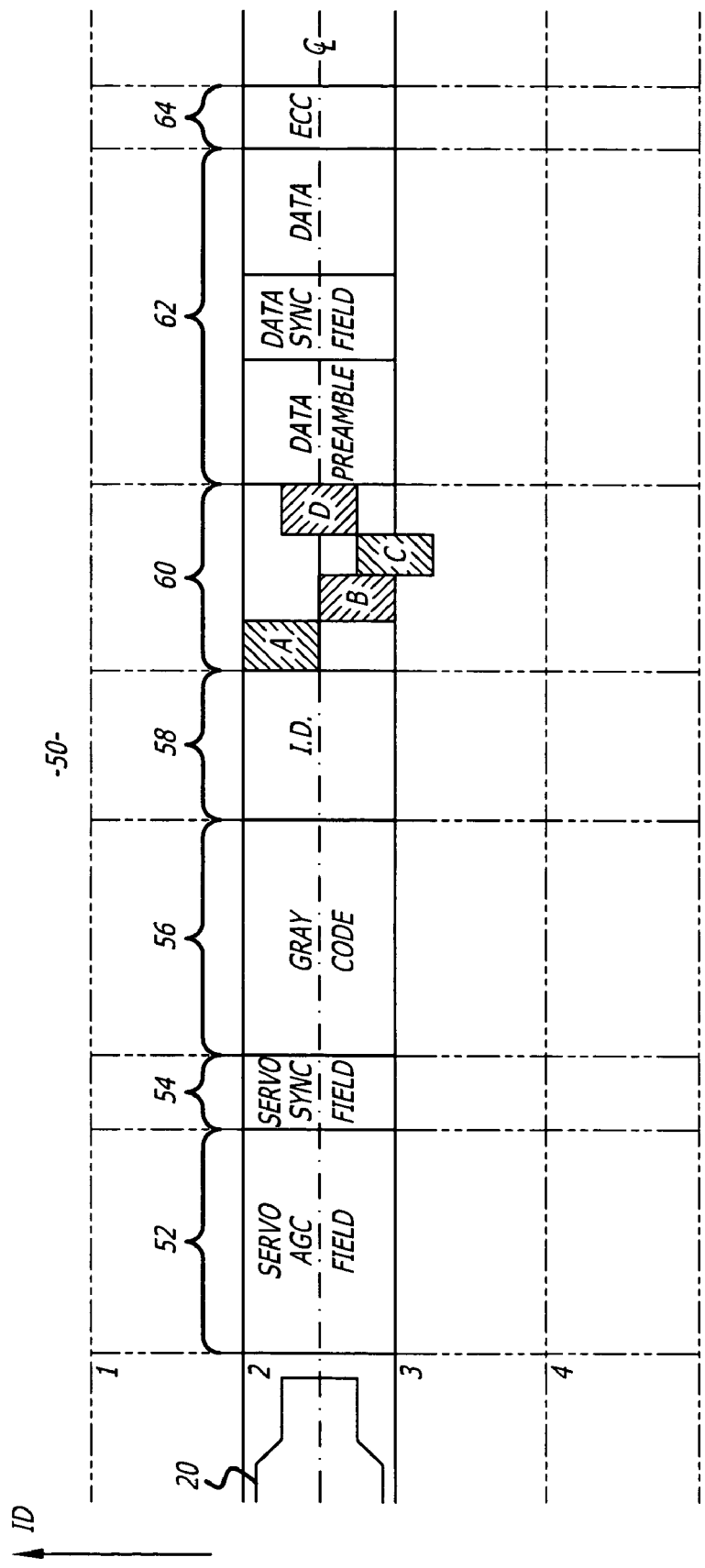
FIG. 2 is an illustration of a track sector of a disk.

FIG. 2 shows a head 20 located on a typical data sector 50 of a disk. The data stored on the disks is organized into concentric tracks that extend across the surface of the disks 10. Each track is divided up into a plurality of data sectors 50. Each sector 50 may include an AGC field 52, a sync pulse or field 54, a gray code field 56, an ID field 58, A, B, C and D servo bits 60, a data field 62 and an ECC field 64 as is known in the art.

Figure 3:
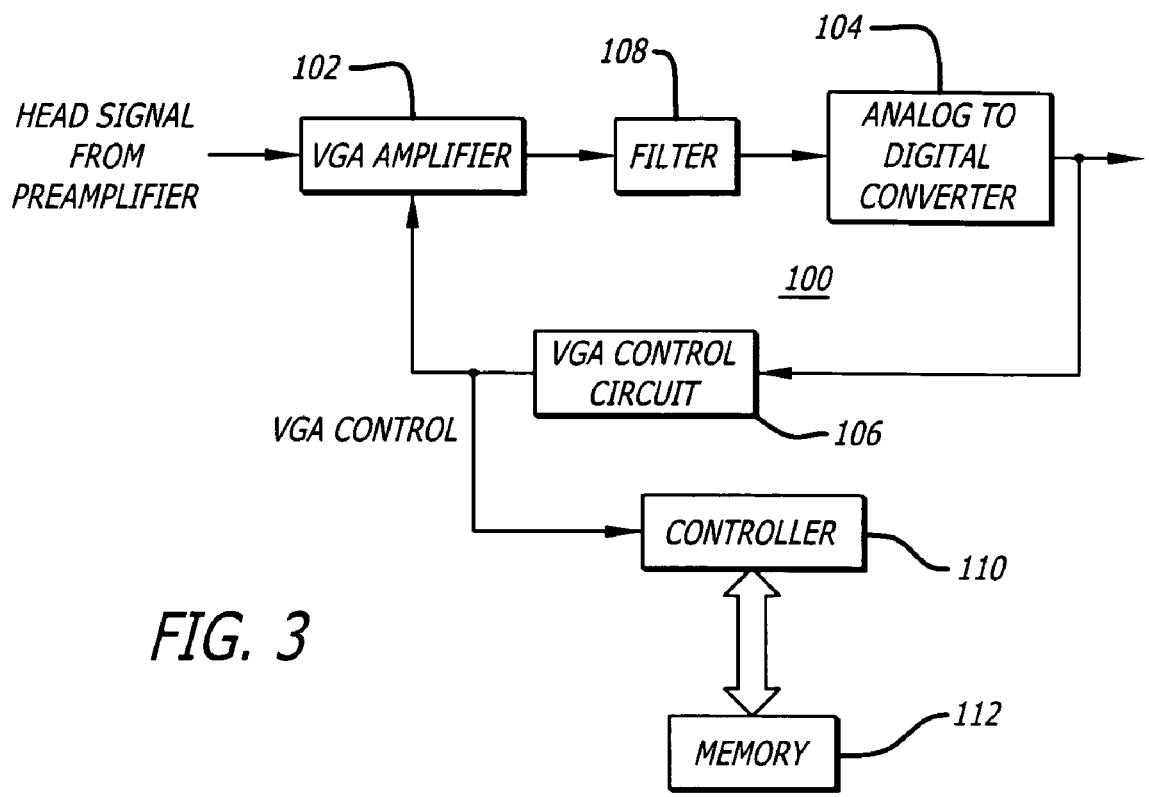
FIG. 3 is a schematic showing an automatic gain control circuit of the disk drive.

FIG. 3 shows an automatic gain control circuit 100 of the disk drive 10. The circuit 100 is used to adjust the gain of an amplifier 102 that amplifies a read signal provided by a head. The circuit includes an analog to digital ("A/D") converter 104 and a variable gain amplifier (VGA) control circuit 106. The control circuit 106 receives a digital version of the read signal from the A/D converter 104 and provides a VGA control signal to the amplifier 102. The VGA signal controls the gain of the amplifier. In general, a lower read signal will produce a larger VGA signal and vice versa. The circuit 100 may also have a filter 108.

The VGA control signal is also provided to a controller 110 of the disk drive 10. The controller 110 may be a processor such as a digital signal processor ("DSP") that performs routines in accordance with instructions and data. The instructions and data can be stored in memory 112. Memory 112 may include one or more volatile or non-volatile storage devices that store a program. The program may cause the controller to perform a routine that is used to determine an optimum track density per head. The controller 110 may also control other aspects of the drive such as the read channel, voice coil motor and spindle motor.

Figure 4A:
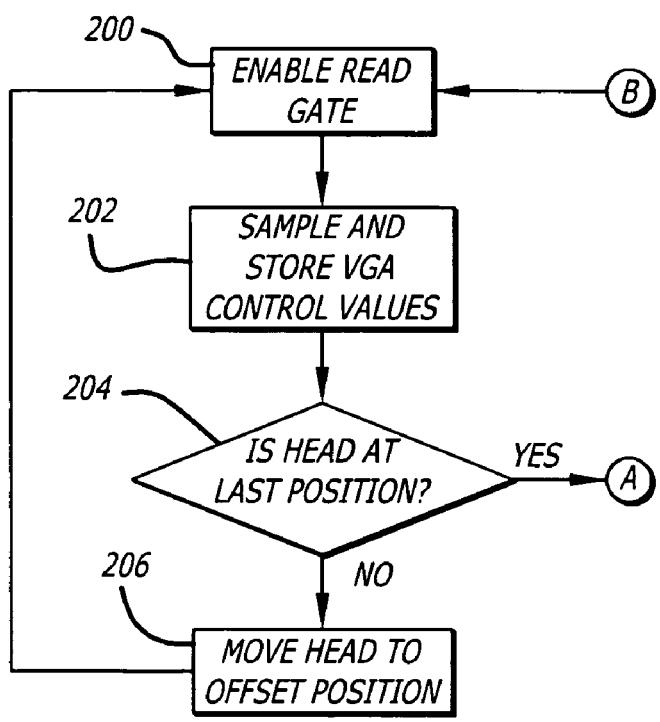
FIGS. 4a and 4b are flowcharts showing a method for optimizing a track density of a head.
Figure 4B:
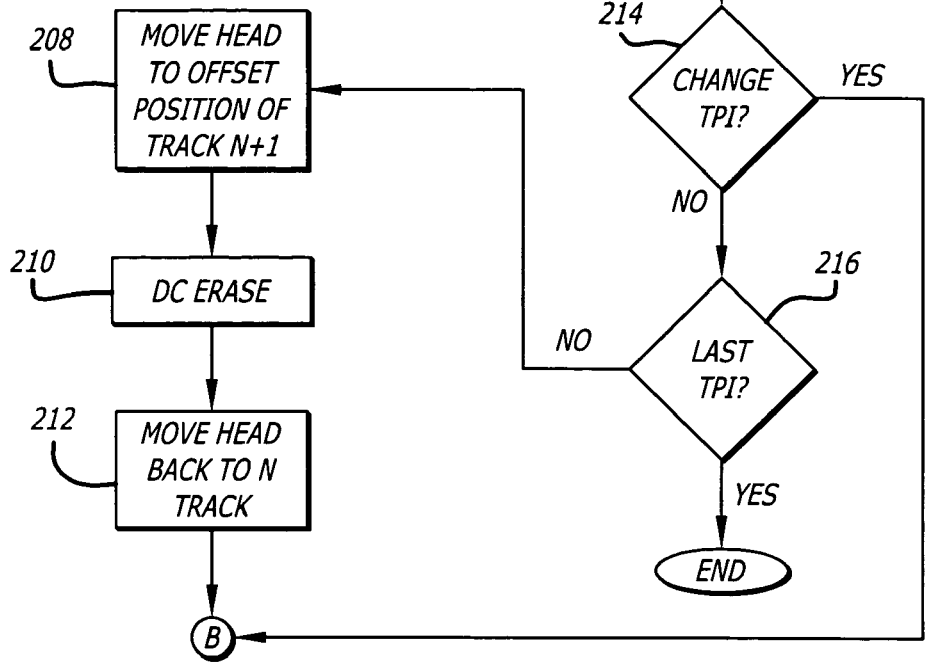

FIG. 4 is a flowchart for a method used to determine an optimum track density for each head of the drive. In block 200 the read gate of a head is enabled. The head preferably reads the AGC field of a disk sector. Reading the AGC field eliminates the need to perform a read channel optimization routine and thus reduces the time required to determine an optimum TPI. In block 202 the VGA control signal is periodically sampled and stored as a plurality of first VGA data points. The process determines whether the head is at the last position on the track in decision block 204. If not, the head is moved to an offset position relative to the center of the N track in block 206. Steps 200–204 are repeated until VGA control data is accumulated for various offset positions of the N track.

After the VGA data has been accumulated for track N the head is moved to an offset position of an adjacent track N+1 in block 208. By way of example, the head may be offset 30% from the center of the N+1 track. In block 210, the write gate of the head is enabled and at least a portion of the track is erased, typically with a DC erase technique. Because the head is offset from the center of the N+1 track a portion of the N track will also be erased.

In block 212, the head is moved over to the N track. The process of accumulating VGA control signal data for different offset positions if repeated in blocks 200–206. The process is repeated for different track densities TPIs through decision blocks 214 and 216.

Figure 5:
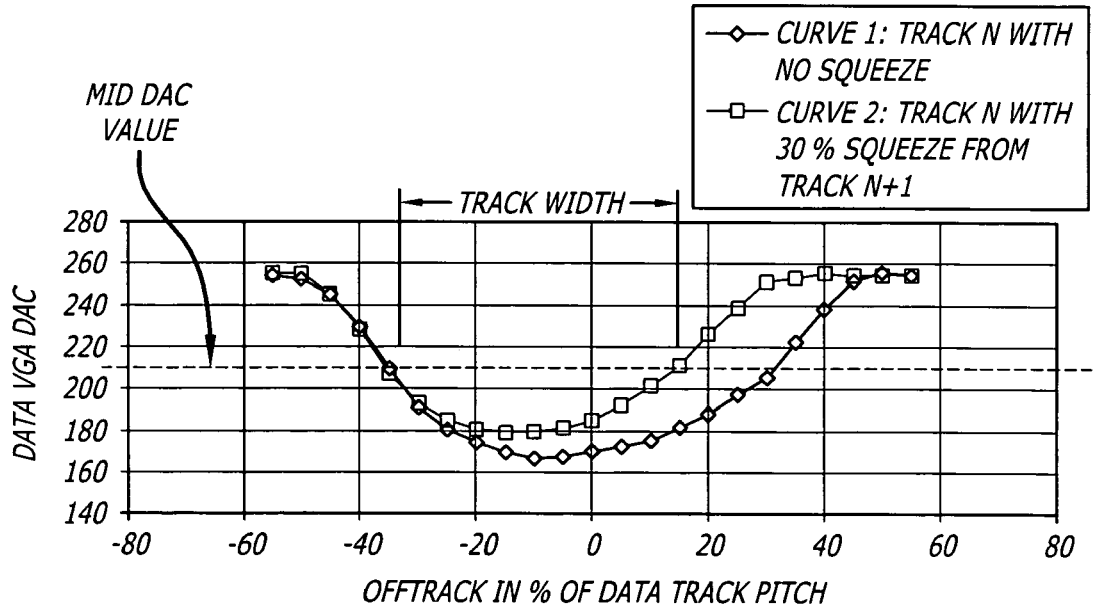
FIG. 5 is a graph showing VGA values plotted as a function of a percentage of track offset position per TPI before and after an adjacent track has been erased.
Figure 6:
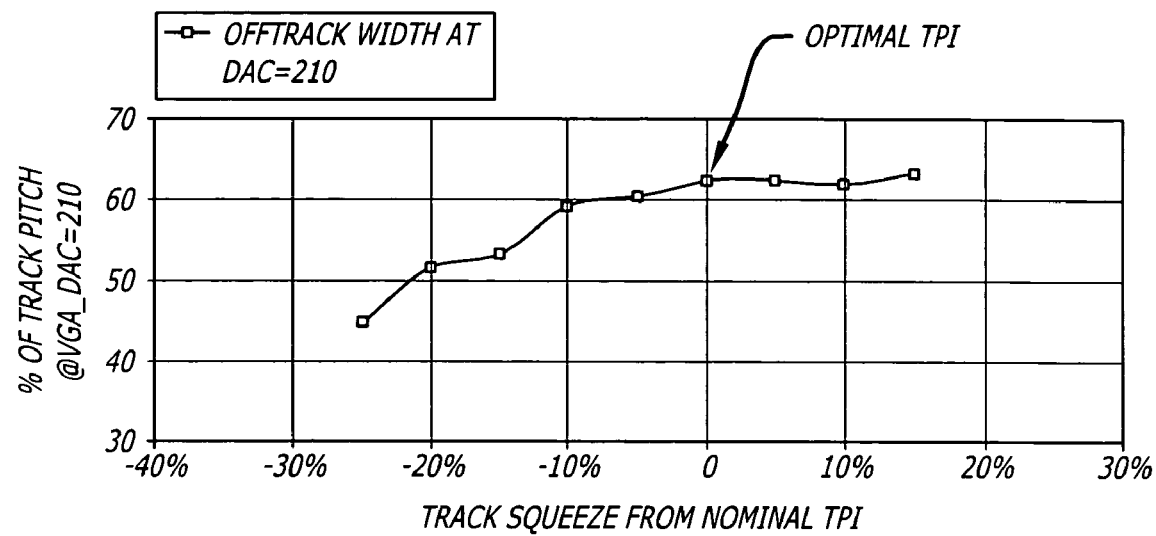
FIG. 6 is a graph showing the track offset percentage values for a given VGA value.

As shown in FIG. 5 the first VGA values, without the DC erase, and the second VGA values, with the DC erase, can be plotted versus the offset position as a percentage of the track pitch TPI. The track width can be defined as the distance in terms of % offset between the points that intercept at a mid-range VGA value. As shown in FIG. 5, the effective track width is shrunk after the erase process. As shown in FIG. 6, the effective track width for different TPI values, depicted as a percentage of a nominal TPI value, can be plotted. The optimal TPI can be determined from this plot as the point where the track width begins to decrease.

The process of utilizing the VGA control signals to accumulate data provides a method for optimizing track density that is less time consuming than the bit error techniques of the prior art. Additionally, reading the AGC field of the track sectors eliminates the need for read channel optimization, further reducing the time required to determine optimum TPI. Reducing the process time is particularly advantageous when mass producing disk drives.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for providing data to determine an optimal track per inch format for a disk of a hard disk drive that generates a VGA signal, comprising:
   moving the head to an offset position of an N+1 track;
   enabling a write gate of the head;
   erasing at least a portion of the N+1 track;
   moving the head to an N track;
   enabling a read gate of the head;
   storing a VGA control signal value;
   repeating the process of moving, enabling and storing VGA control signal values for different offset positions of the N track;
   repeating the process of erasing a portion of an N+1 track and storing VA control signal values for an N track with different track densities;
   determining a plurality of effective head widths; and,
   plotting the effective head widths versus different track densities.

2. The method of claim 1, wherein the head reads an AGC field.

3. The method of claim 1, wherein the N+1 track offset is approximately 30%.

4. The method of claim 1, wherein the effective head widths are determined at approximately a mid-range of the VGA control signal values.

5. The method of claim 1, further comprising repeating a process of moving, enabling and storing VGA control signal values before erasing the N+1 track.

6. A hard disk drive, comprising:
   a base plate;
   a spindle motor coupled to said base plate;
   a disk coupled to said spindle motor;
   an actuator arm mounted to said base plate;
   a voice coil motor coupled to said actuator arm;
   a flexure beam coupled to said actuator arm;
   a head coupled to said flexure beam; and,
   a controller coupled to said head, said controller operates a routine to move the head to an offset position of an N+1 track, enable a write gate of the head, erase at least a portion of the N+1 track, move the head to an N track, enable a read gate of the head, store a VGA control signal value, repeat the process of moving, enabling and storing VGA control signal values for different offset positions of the N track, repeat the process of erasing a portion of an N+1 track and storing VGA control signal values for an N track with different track densities, determine a plurality of effective head widths and plot the effective head widths versus different track densities.

7. The assembly of claim 6, wherein said disk includes an AGC field that is read to create the plotted VGA values.

8. The assembly of claim 6, wherein said N+1 track offset is approximately 30%.

9. The assembly of claim 6, wherein the effective head widths is at approximately a mid-range of the first VGA values.

10. The assembly of claim 6, wherein said controlling repeats a process of moving, enabling and storing VGA control signal values before erasing the N+1 track.

11. A program storage medium that causes a controller of a hard disk drive to perform a routine used to determine an optimal track per inch, comprising:
   a program storage medium that causes a controller to move the head to an offset position of an N+1 track, enable a write gate of the head, erase at least a portion of the N+1 track, move the head to an N track, enable a read gate of the head, store a VGA control signal value, repeat the process of moving, enabling and storing VGA control signal values for different offset positions of the N track, repeat the process of erasing a portion of an N+1 track and storing VGA control signal values for an N track with different track densities, determine a plurality of effective head widths and plot the effective head widths versus different track densities.

12. The storage medium of claim 11, wherein the routine causes the head to read an AGC field of the disk that is used to create the plotted VGA values.

13. The storage medium of claim 11, wherein the N+1 track offset is approximately 30%.

14. The storage medium of claim 11, wherein the VGA value is at approximately a mid-range of the first VGA values.

15. The storage medium of claim 11, wherein the routine causes the controller to repeat a process of moving, enabling and storing VGA control signal values before erasing the N+1 track.

* * * * *